US012529243B2

(12) United States Patent
Shaffer et al.

(10) Patent No.: US 12,529,243 B2
(45) Date of Patent: Jan. 20, 2026

(54) POWER CONTROLLER FOR A DOOR LOCK AND METHOD OF CONSERVING POWER

(71) Applicant: Hanchett Entry Systems, Inc., Phoenix, AZ (US)

(72) Inventors: Randall Shaffer, Phoenix, AZ (US); David Corbin, Phoenix, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 0 days.

(21) Appl. No.: 18/642,886

(22) Filed: Apr. 23, 2024

(65) Prior Publication Data

US 2024/0279961 A1 Aug. 22, 2024

Related U.S. Application Data

(60) Division of application No. 17/036,102, filed on Sep. 29, 2020, now Pat. No. 11,993,953, which is a (Continued)

(51) Int. Cl.
*E05B 47/00* (2006.01)
*G07C 9/00* (2020.01)
*H01F 7/06* (2006.01)

(52) U.S. Cl.
CPC ...... *E05B 47/0001* (2013.01); *G07C 9/00309* (2013.01); *H01F 7/064* (2013.01); (Continued)

(58) Field of Classification Search
CPC .... E05B 47/0001-2047/0008; G07C 9/00309; H01F 7/64
(Continued)

(56) References Cited

U.S. PATENT DOCUMENTS 4,594,637 A 6/1986 Falk
4,967,305 A 10/1990 Murrer et al.
(Continued)

FOREIGN PATENT DOCUMENTS

EP 1452879 9/2004
WO WO2014028332 2/2014
WO WO2014152187 9/2014

OTHER PUBLICATIONS

Oprea, Karen, Office Action, Canadian Patent Application No. 2,926,929, Apr. 25, 2022, 4 pages, Quebec, Canada.
(Continued)

*Primary Examiner* — Thienvu V Tran
*Assistant Examiner* — Christopher J Clark
(74) *Attorney, Agent, or Firm* — Woods Oviatt Gilman LLP; Dennis B. Danella, Esq.

(57) ABSTRACT

A power control system for use with an electric lock mechanism including an actuator having a coil with a particular coil impedance. The power control system comprises a power supply configured to provide an output voltage having a drive current to the actuator, a credential device powered by the power supply and configured to signal the power supply to provide the output voltage upon receiving an authorized access code, an actuator driver including a multiple-gain current-sensing circuit, and a microcontroller configured to monitor and control the power supply, credential device, actuator driver, and actuator, and determine the impedance of the coil. The microcontroller is populated by a look-up table having performance data for a plurality of coils such that the microcontroller selects a duty ratio to establish the optimum magnitude of drive current to the coil based only on the determined impedance of the coil.

5 Claims, 16 Drawing Sheets

Related U.S. Application Data continuation of application No. 15/098,484, filed on Apr. 14, 2016, now Pat. No. 10,815,695.

(60) Provisional application No. 62/147,490, filed on Apr. 14, 2015.

(52) U.S. Cl.
CPC ................. *E05B 2047/0054* (2013.01); *E05B 2047/0057* (2013.01); *E05B 2047/0058* (2013.01); *E05B 2047/0067* (2013.01); *E05B 2047/0097* (2013.01); *G07C 2009/00373* (2013.01); *G07C 2009/00642* (2013.01)

(58) Field of Classification Search
USPC .......................................................... 361/166
See application file for complete search history.

(56) References Cited

U.S. PATENT DOCUMENTS

| | | | | |
|---|---|---|---|---|
| 5,140,173 | A | 8/1992 | Chau et al. | |
| 5,751,532 | A | 5/1998 | Kanuchok et al. | |
| 5,757,605 | A | 5/1998 | Furukawa | |
| 5,894,277 | A * | 4/1999 | Keskin ............... | G07C 9/00896 235/382 |
| 5,987,818 | A | 11/1999 | Dabideen | |
| 6,021,038 | A | 2/2000 | Hanchett, Jr. | |
| 7,330,344 | B2 * | 2/2008 | Gaessler ................. | F02D 41/20 361/166 |
| 7,683,604 | B1 | 3/2010 | Steele et al. | |
| 9,447,609 | B2 | 9/2016 | Johnson et al. | |
| 2001/0030589 | A1 | 10/2001 | Dahlgren et al. | |
| 2007/0176775 | A1 | 8/2007 | White | |
| 2007/0242408 | A1 | 10/2007 | Bergstrom et al. | |
| 2009/0052107 | A1 | 2/2009 | Maclennan et al. | |
| 2009/0085717 | A1 | 4/2009 | Kirkjan | |
| 2013/0305353 | A1 * | 11/2013 | McMillan ............... | G06F 21/31 726/19 |
| 2014/0062539 | A1 | 3/2014 | Buthker et al. | |
| 2015/0109104 | A1 | 4/2015 | Fadell et al. | |
| 2015/0129344 | A1 | 5/2015 | Nehls et al. | |
| 2015/0311778 | A1 | 10/2015 | Chang et al. | |
| 2016/0020632 | A1 | 1/2016 | Lickfelt et al. | |
| 2016/0053514 | A1 * | 2/2016 | Savage ................. | E05B 65/025 312/326 |
| 2016/0133071 | A1 | 5/2016 | Henderson | |
| 2016/0145898 | A1 | 5/2016 | Ohl et al. | |
| 2016/0145901 | A1 | 5/2016 | Levy | |
| 2016/0215524 | A1 | 7/2016 | Yoshikawa et al. | |

OTHER PUBLICATIONS

Clark, Christopher J., Final Office Action, U.S. Appl. No. 15/098,484, filed Apr. 17, 2019, 46 pages, U.S. Patent & Trademark Office.
Clark, Christopher J., Final Office Action, U.S. Appl. No. 17/036,102, filed Aug. 2, 2023, 15 pages, U.S. Patent & Trademark Office.
Clark, Christopher J., Non-Final Office Action, U.S. Appl. No. 15/098,484, filed Aug. 30, 2018, 27 pages, U.S. Patent & Trademark Office.
Clark, Christopher J., Non-Final Office Action, U.S. Appl. No. 17/036,102, filed Jun. 1, 2022, 23 pages, U.S. Patent & Trademark Office.
Clark, Christopher J., Non-Final Office Action, U.S. Appl. No. 15/098,484, filed Aug. 22, 2019, 10 pages, U.S. Patent & Trademark Office.
Clark, Christopher J., Final Office Action, U.S. Appl. No. 15/098,484, filed Feb. 27, 2020, 16 pages, U. S. Patent & Trademark Office.
Clark, Christopher J., Final Office Action, U.S. Appl. No. 17/036,102, filed Oct. 6, 2022, 12 pages, U.S. Patent & Trademark Office.
Clark, Christopher J., Non-Final Office Action, U.S. Appl. No. 17/036,102, filed Feb. 21, 2023, 11 pages, U.S. Patent & Trademark Office.
Clark, Christopher J., Non-Final Office Action, U.S. Appl. No. 17/036,102, filed Nov. 28, 2023, 20 pages, U.S. Patent & Trademark Office.

* cited by examiner

| | | | | |
|---|---|---|---|---|
| FIG. 2A. | FIG. 2B. | FIG. 2C. | FIG. 2D. | FIG. 2E. |
| FIG. 2F. | FIG. 2G. | FIG. 2H. | FIG. 2I. | FIG. 2J. |

*FIG. 2.*

POWER CONTROLLER FOR A DOOR LOCK AND METHOD OF CONSERVING POWER

CROSS-REFERENCE TO RELATED APPLICATIONS

This application is a divisional of U.S. patent application Ser. No. 17/036,102, filed on Sep. 29, 2020, which is a continuation of U.S. patent application Ser. No. 15/098,484, filed Apr. 14, 2016, now U.S. Pat. No. 10,815,695, which claims the benefit of U.S. Patent Application No. 62/147,490, filed Apr. 14, 2015, the contents of which are hereby incorporated by reference in their entirety.

TECHNICAL FIELD

The present invention relates to power systems for use with an electric lock mechanism. More specifically, the invention relates to improved power control systems that afford improved power efficiencies when powering an electric lock mechanism such as an electromagnetic lock system actuated by a motor or solenoid. In one aspect of the invention, the power control system includes an array of resistors coupled to a microcontroller programmed to incorporate a look-up table. The power control system selects a duty ratio to most efficiently power the lock mechanism, depending upon the sensed solenoid current and the associated current values identified in the look-up table. In a further aspect of the present invention, the power control system includes a microcontroller programmed to stagger delivery of operating currents to two or more lock mechanisms so as to reduce the peak current needed from the circuit. In another aspect of the invention, the power control system is configured to turn off power to an electromagnet actuator of the lock mechanism and/or an access credential device when the credential device is not being used to control the lock mechanism. In another aspect of the invention, the power control system is configured to enter a sleep mode during which negligible power is drawn from the AC source.

BACKGROUND OF THE INVENTION

As is known in the art of access control systems such as door locks, typically an electrically-controlled strike may be mounted in a frame portion of a door to engage a lockset disposed on or in an edge portion of the corresponding door. Typically, the lockset may be a cylindrical-type or mortise-type lockset and includes a latch, and possibly a dead latch. In the case of a mortise-type lockset, the dead latch is linearly spaced apart from the latch along the edge portion of the door. In either lockset type, the latch is reciprocally moveable between an engaged position and released position. When in the engaged position the latch can engage an entry chamber in the strike and thereby secure the door in a closed state. When in the released position, the latch is permitted to exit the entry chamber and to release the door from the closed state and is free to open.

When included, the dead latch is reciprocally moveable between an enabling position (extended) and a disabling position (depressed). The enabling position permits movement of the latch from its engaged position to the released position. The disabling position prohibits movement of the latch from its engaged position to its released position. Typically, the latch is resiliently biased into the engaged position and the dead latch is resiliently biased into the enabled position.

Solenoids are often used as the driver to actuate many types of electromechanical devices, such as for example electromechanical door latches or strikes. In the use of solenoids as drivers in electromechanical door latches or strikes, the solenoids may be spring biased to either a default locked or unlocked state, depending on the intended application of the strike or latch. When power is applied to the solenoid, the solenoid is powered away from the default state to bias a return spring. The solenoid will maintain the bias as long as power is supplied to the solenoid. Once power has been intentionally removed, or otherwise, such as through a power outage from the grid or as a result of a fire, the solenoid returns to its default locked or unlocked state.

In a fail-safe lock system, power is supplied to the solenoid to lock the latch or strike. With power removed, a return spring moves the mechanism to an unlocked state. Thus, as long as the latch or strike remains locked, power has to be supplied to the solenoid to maintain stored energy in the return spring. The power to pull in the plunger of the solenoid is referred to as the "pick" power and the power to hold the plunger in its activated position is referred to as the "hold" power. Typically, the hold current is substantially less than the pick current.

In a fail-secure system, the reverse is true. With power removed, the return spring moves the latching mechanism to a locked state. Thus, as long as the latch remains unlocked, power has to be supplied to the solenoid to maintain stored energy in the return spring. Again, the hold current is substantially less than the pick current.

A system designed to overcome the shortcomings of solenoid lock systems is disclosed in the prior art disclosure from Sargent Manufacturing Company (WO2014/028332—herein referred to as "the '332 publication"), the entirety of which is incorporated herein by reference. As disclosed in the '332 publication, the solenoid used to drive the door lock mechanism is swapped out for a small DC motor that moves a latching plate. This change, in combination with the motor aligning with and engaging an auger/spring arrangement, reduced standby power consumption of the driver from about 0.5 A to about 15 mA.

International Patent Application, Serial No. PCT/US2014/027050 (herein referred to as "the '050 PCT application"), the relevant disclosure of which is incorporated herein by reference, discloses a circuit, apparatus and method for improving energy efficiency, reducing cost and/or improving quality of electronic locks. The electronic lock controller circuit includes an input for receiving a legacy pulse, a power circuit for extracting power from the legacy pulse to power the electronic lock controller circuit, a detector circuit for detecting a polarity of the legacy pulse and a microcontroller having an output for connection to a lock actuator. The microcontroller sends an output pulse via the output to control the lock actuator and the output pulse having reduced power as compared to the legacy pulse at the input. The power may be reduced by reducing voltage and/or reducing the duration of the voltage pulse.

What is needed in the art is a power control system that operates an actuator-controlled lock mechanism, which can achieve improved power efficiencies, such as through entering a low-power state when actuation is not required, sensing and compensating for actuators having different power profiles by providing the optimum power needed to activate the particular actuator, and staggering power output to multiple doors during simultaneous activation.

SUMMARY OF THE INVENTION

Briefly described, the present invention is directed to a power control system for use with an electric lock mechanism having an actuator comprising a power supply configured to output a output voltage to the actuator. A credential device is powered by the power supply and is configured to signal the power control system to supply the output voltage upon receiving an authorized access code. A microcontroller monitors and controls the power supply, the credential device, and the actuator. The microcontroller may be selectively configured to operate in either an Access Mode or a Dog Mode. In the Access Mode, the actuator is in an unpowered state and the credential device is in a powered state such that upon receiving the authorized access code, the power control system supplies the output voltage to place the actuator in a powered state. When the batteries are sufficiently charged, the control system enters a sleep mode during which power drawn from the AC source is negligible. In the Dog Mode, the actuator is in a powered state and the credential device is placed in an unpowered state after the actuator remains in the powered state for a predetermined length of time. The predetermined period of time may be about 120 seconds. Power to the actuator device while in the sleep mode may be provided by a battery.

In a further aspect of the present invention, a power control system for use with an electric lock mechanism having an actuator comprises a power supply configured to output a drive current to the actuator. A credential device is powered by the power supply and is configured to signal the power control system to supply the output voltage upon receiving an authorized access code. A microcontroller monitors and controls the power supply, the credential device, the actuator driver, and the actuator. The microcontroller is populated with a look-up table of performance data for a plurality of actuator types such that the microcontroller selects a duty ratio to establish the drive current for a sensed actuator. In accordance with an aspect of the present invention, the actuator may be a solenoid and the drive current may have a first pick-current component and a second hold-current component.

In still a further aspect of the present invention, a power control system for use with two or more electric lock mechanisms, each having a respective actuator, comprises a power supply configured to output a voltage to each respective actuator. A respective credential device is coupled to each electric lock mechanism and is powered by the power supply. Each respective credential device is configured to signal the power control system to supply the output voltage upon receiving a valid access-code. A microcontroller monitors and controls the power supply, each respective credential device, and each respective actuator. In the event two or more of the credential devices signal the power supply at the same time, the microcontroller instructs the power control system to supply to sequentially the output voltage to successive actuators. The credential code may be a fire alarm signal and at least one of the actuators may be a solenoid. The output voltage may have a first pick-current component and a second hold-current component—the pick-current component being greater in magnitude than the hold-current component. The microcontroller may instruct the power control system to supply the output voltage to the next successive actuator after the output voltage begins to provide the second hold-current component.

Numerous applications, some of which are exemplarily described below, may be implemented using the present invention.

BRIEF DESCRIPTION OF THE DRAWINGS

The present invention will now be described, by way of example, with reference to the accompanying drawings, in which:

FIG. 2, 2*a*-2*j* is a composite block diagram of a power control system, in accordance with an aspect of the present invention;

Figure 1:
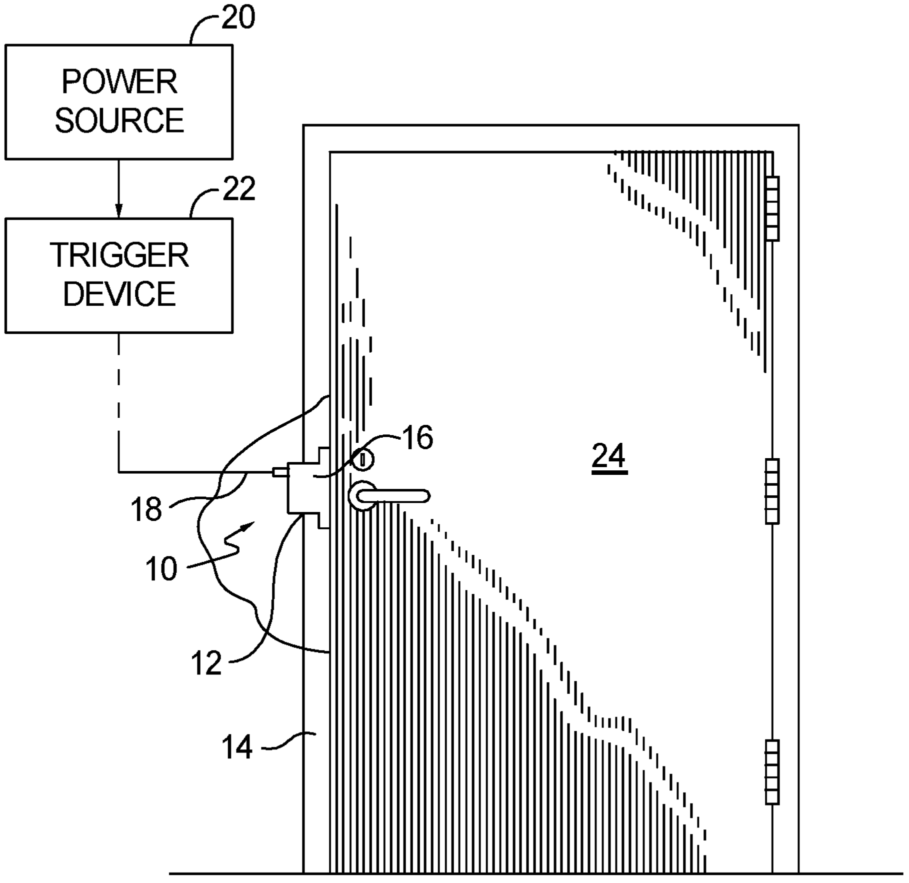
FIG. 1. PRIOR ART
FIG. 1 is a side view of a door in a secure condition at a first door position within a door frame and having a portion of the door frame broken away to show a prior art electrically-controlled strike, in accordance with the present invention and operable with a mortise-type dead latch assembly of the door.
Figure 2A:
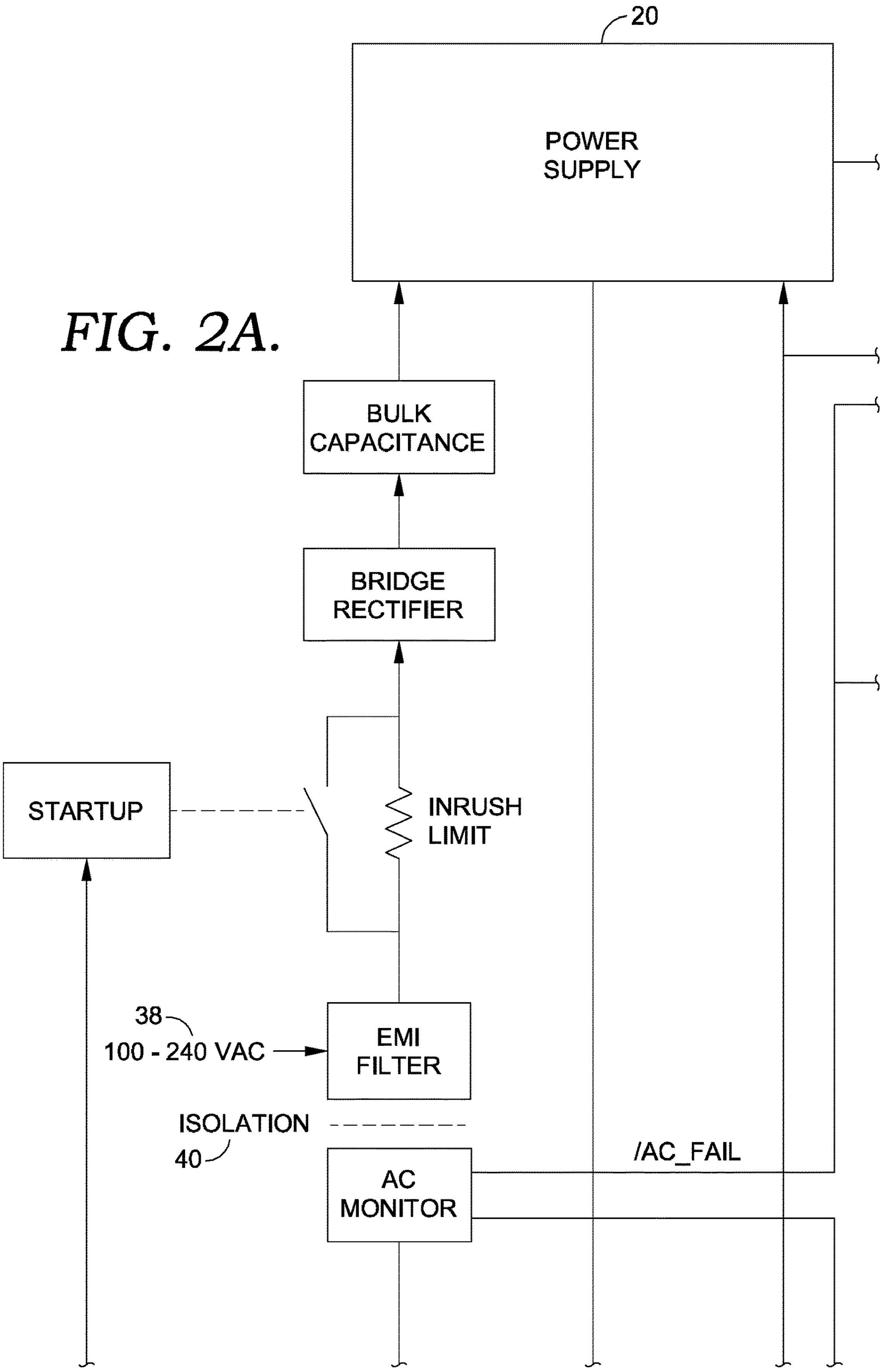
Figure 2B:
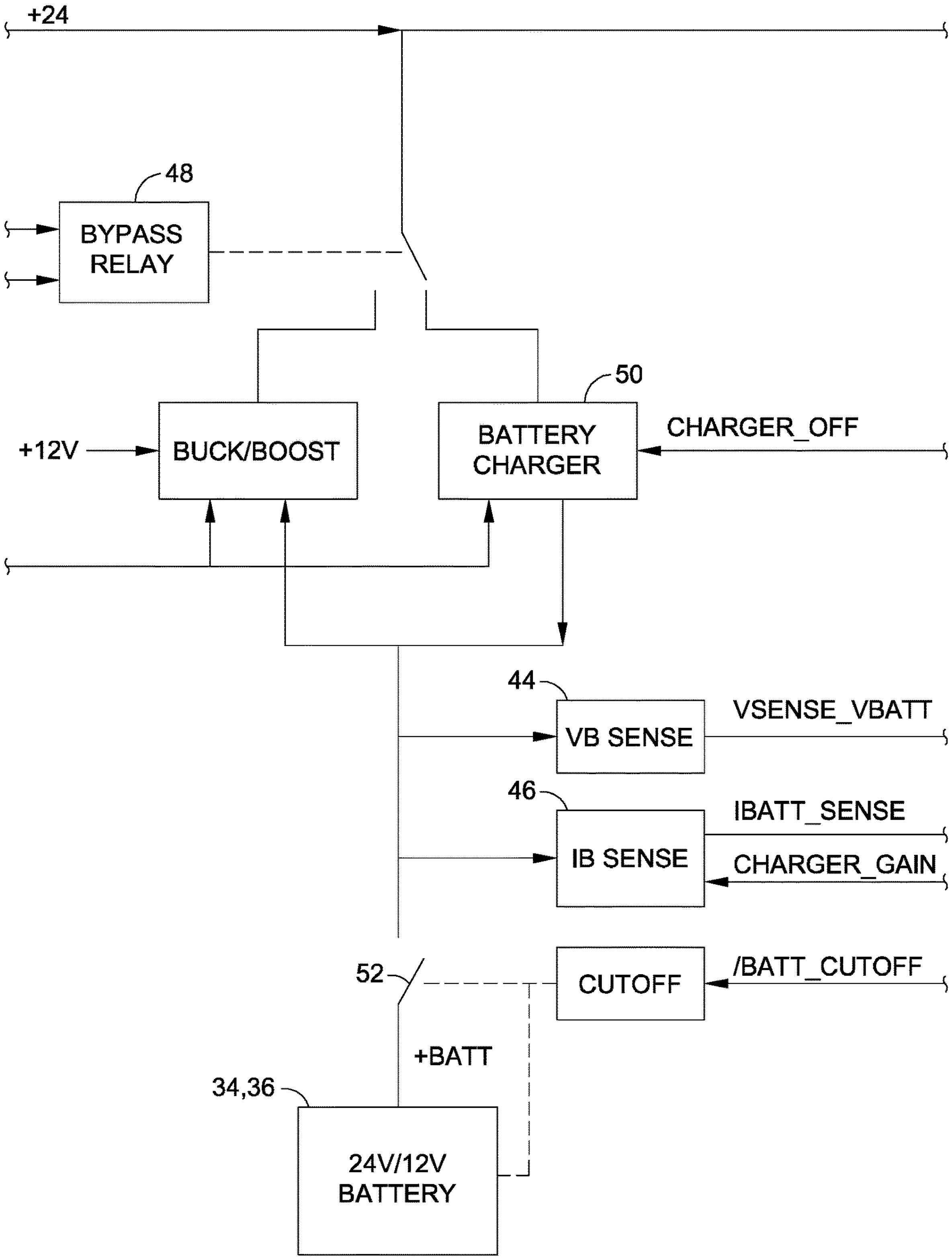
Figure 2C:
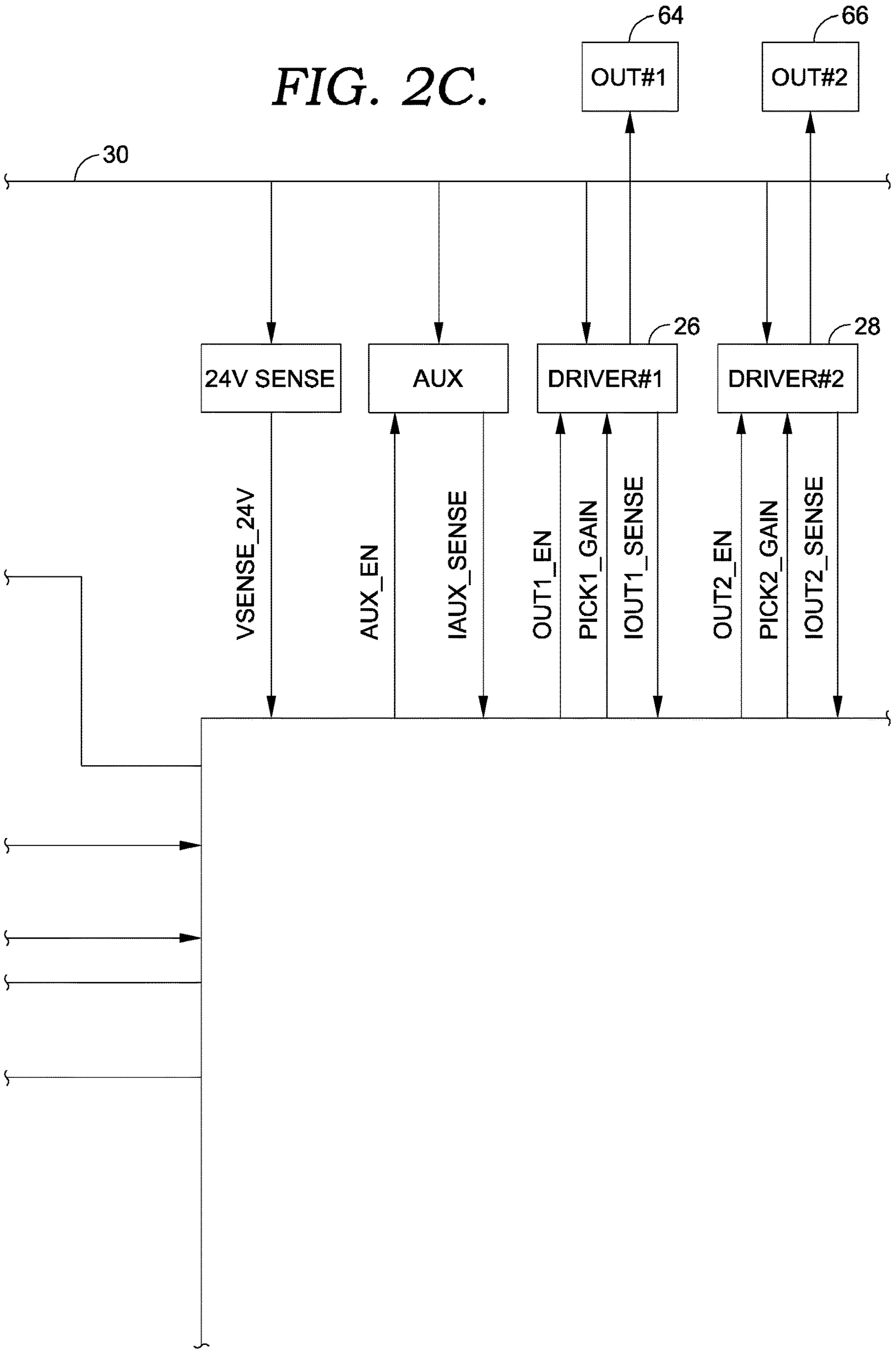
Figure 2D:
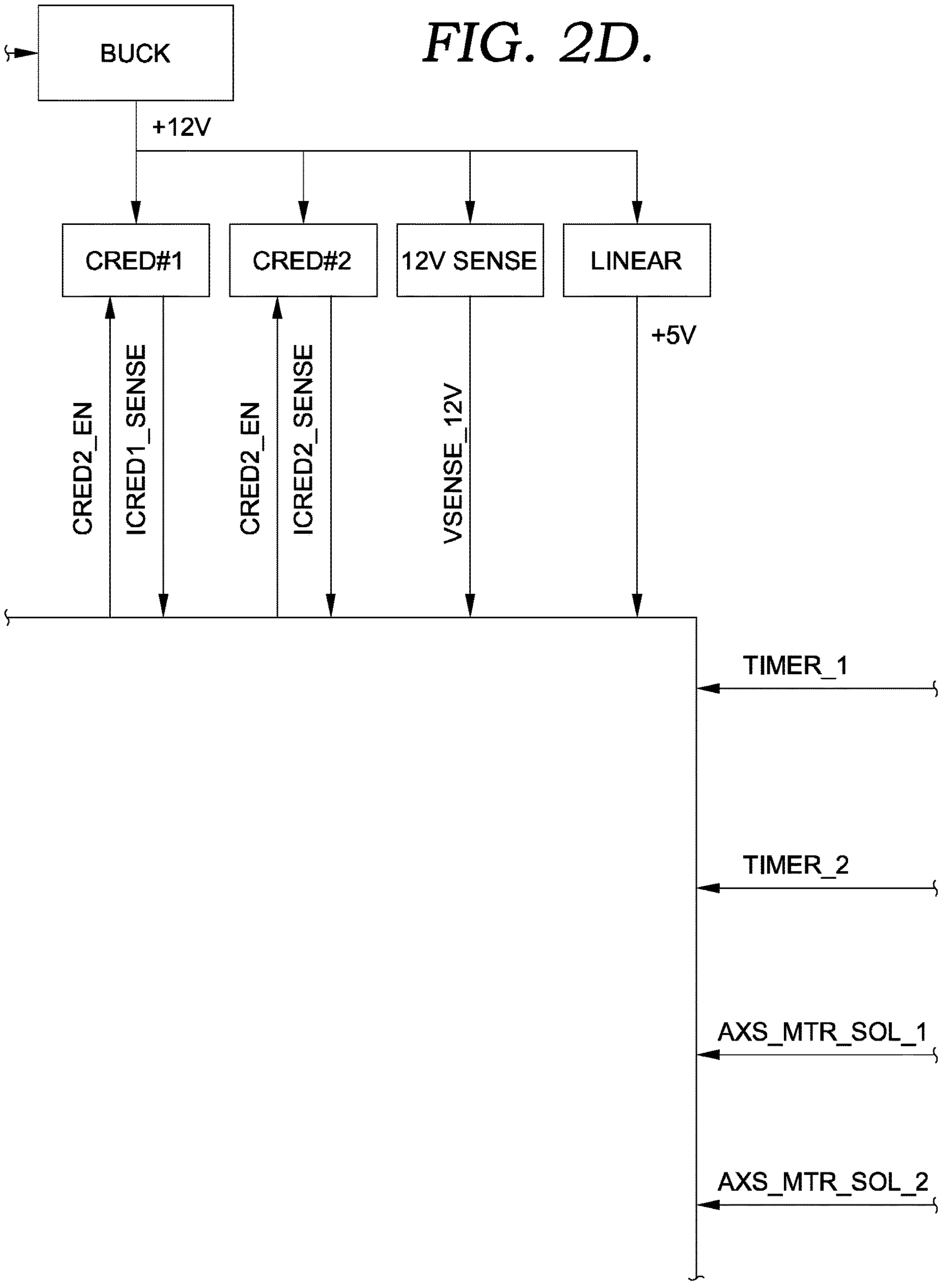
Figure 2E:
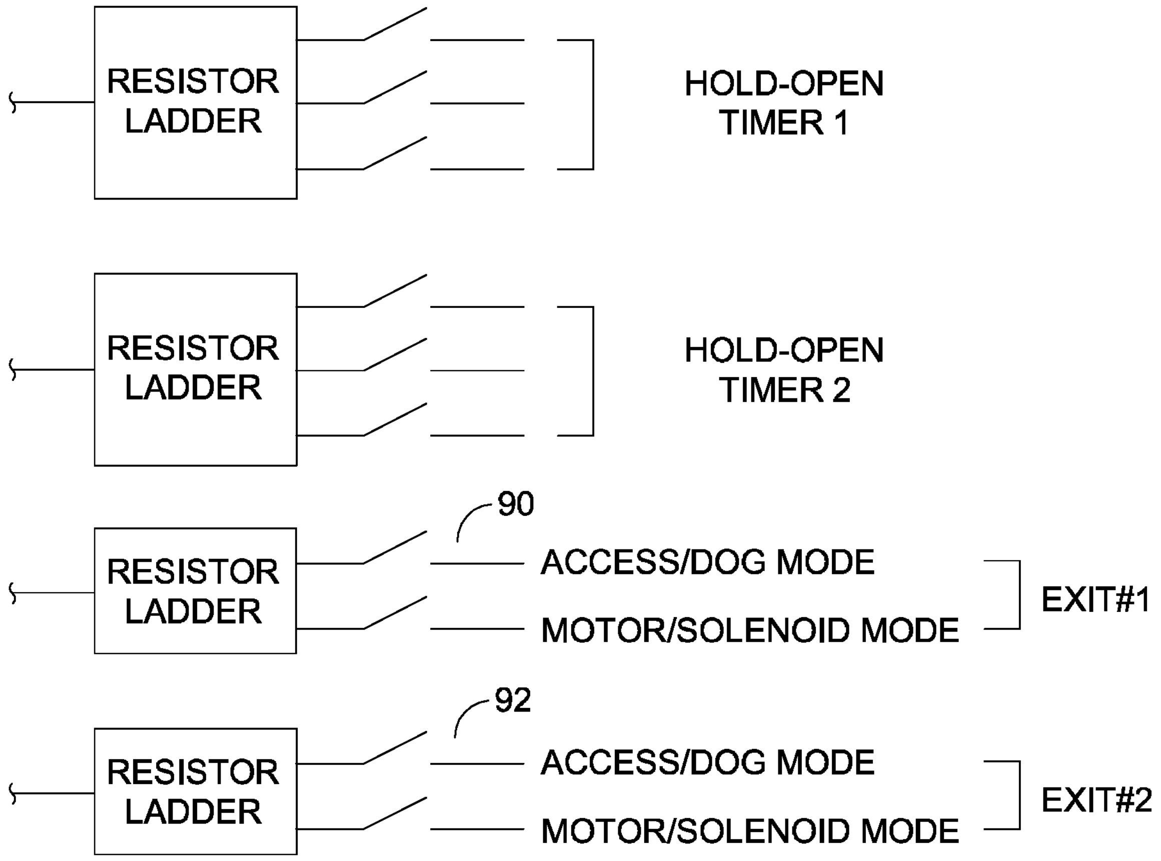
Figure 2F:
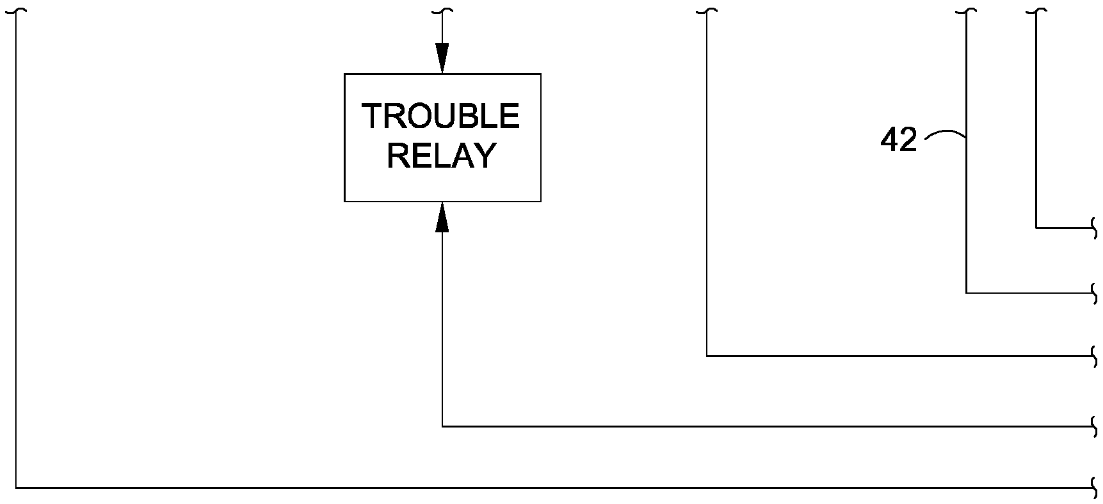
Figure 2G:
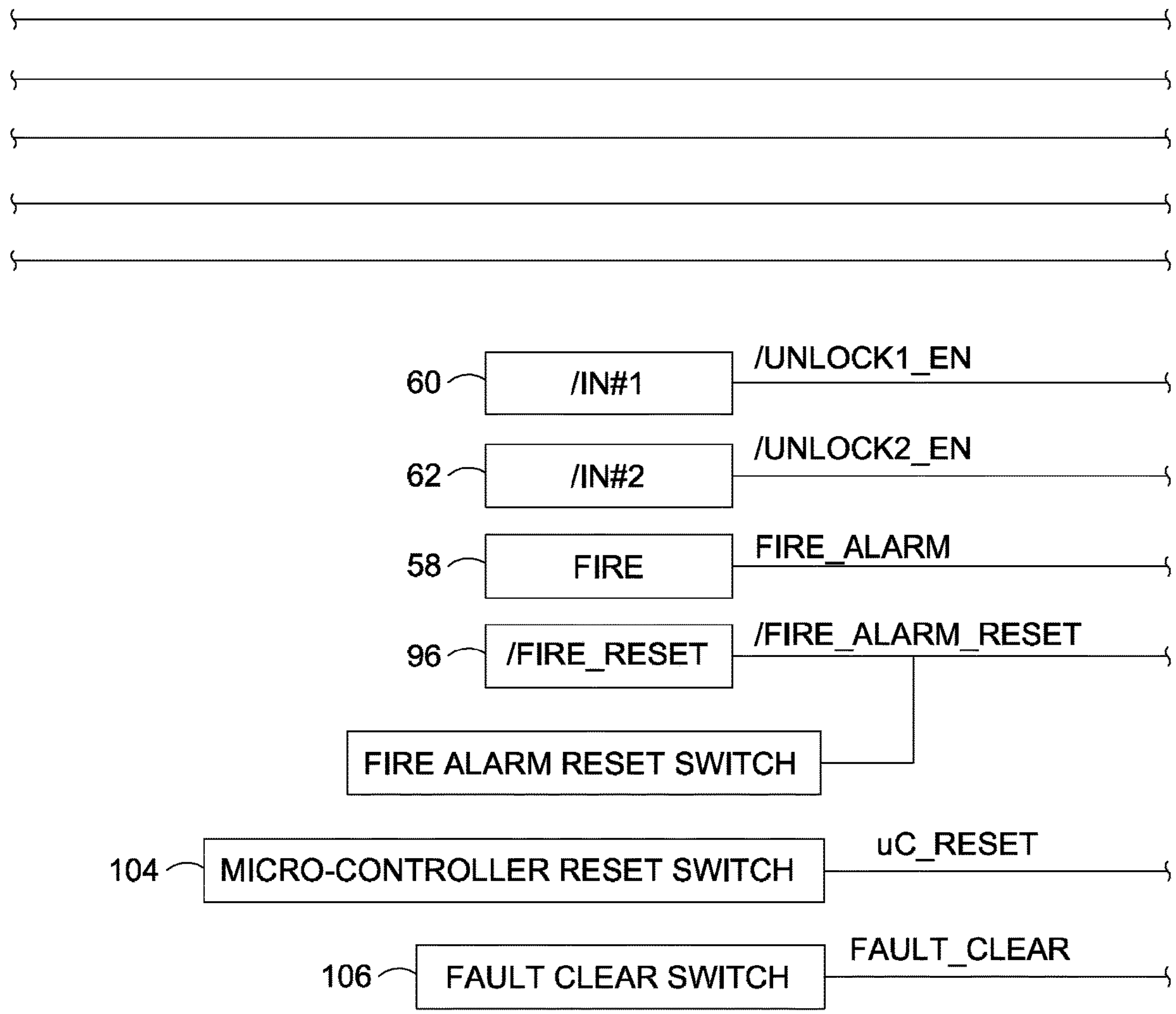
Figure 2H:
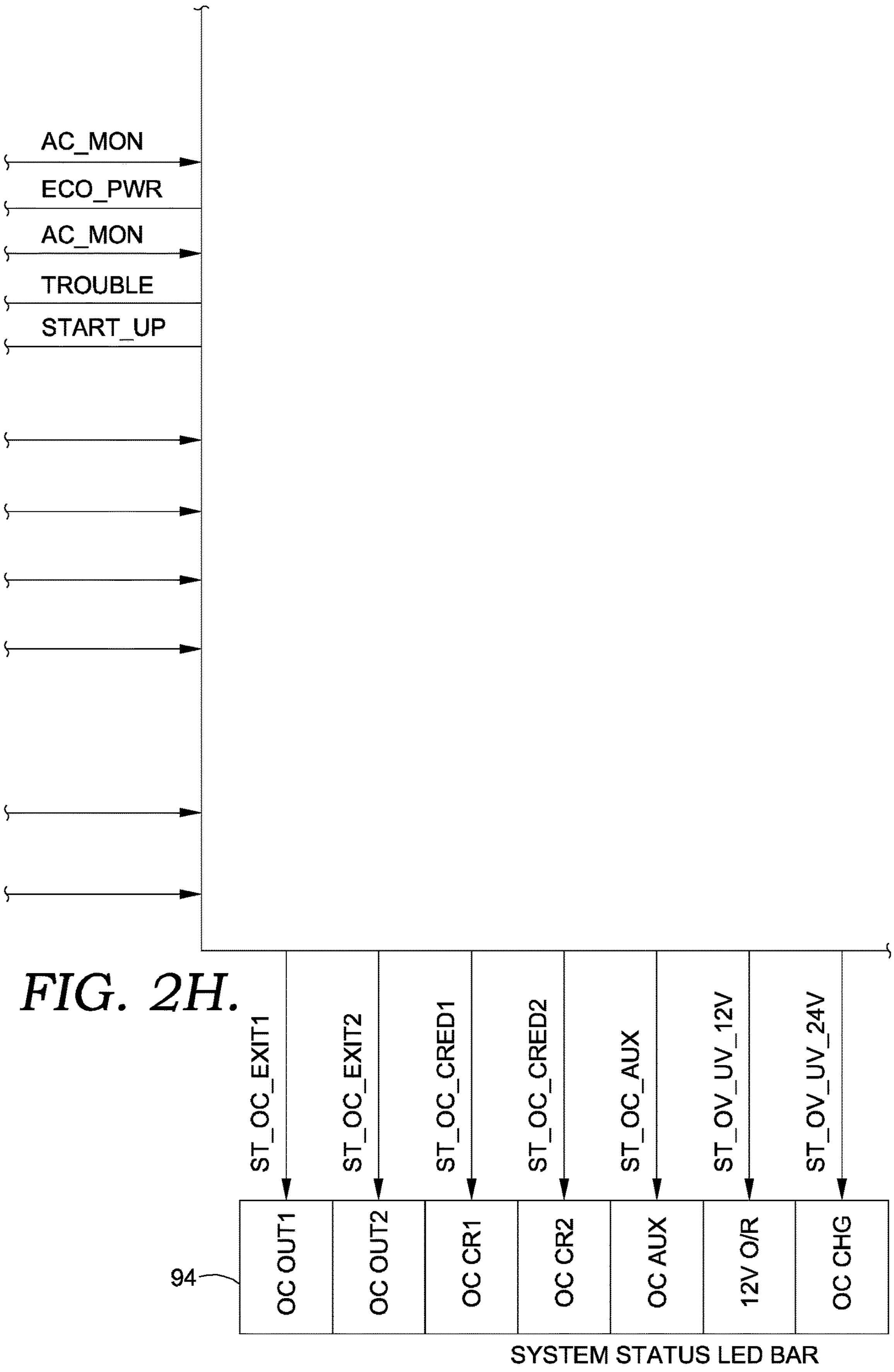
Figure 2I:
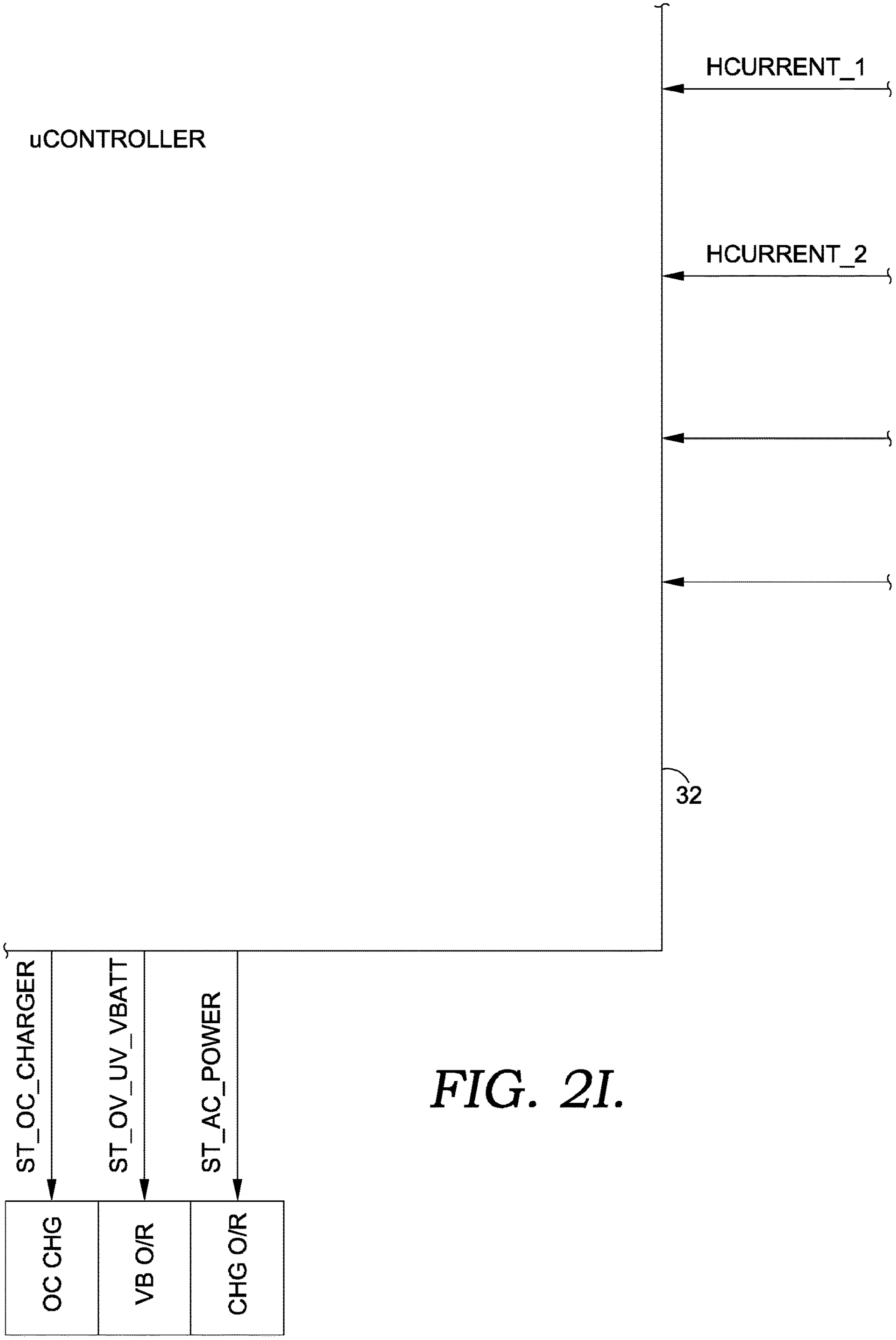
Figure 2J:
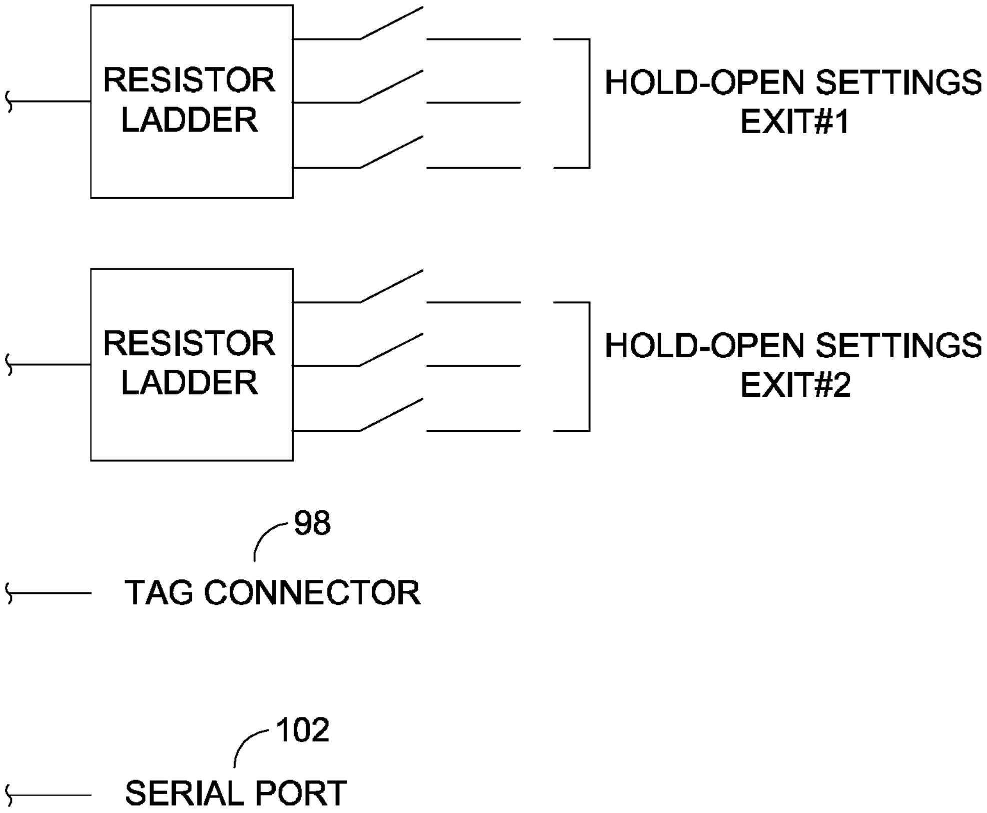

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Referring to FIG. 1, a typical door 24 is shown in a first, or closed, position. A lock actuator 10 (such as, but not limited to, a door lock actuator) is received in a cavity 12 in a mounting structure 14 (such as, but not limited to, a door jamb). Actuator 10 includes a housing 16, which may mount its electrical and mechanical components. The electrical components in turn may be electrically in communication by means of wiring 18. Actuator 10, for example, may be in communication with a power supply 20 such as, for example, a 12 or 24 volt circuit, which in turn may be hardwired to the external electric power grid where power supply 20 is configured to receive 115 VAC or 230 VAC line voltage. The actuator 10 may be activated via a credential device 22. This credential device 22 is typically a switch whose contacts selectively actuate the actuator 10. The credential device 22, however, is often incorporated into a control entry device such as a card reader or digital entry keypad, where the actuator is activated after an authorized card is presented to the card reader (or an authorized code is entered into credential device 22). For example purposes, door 24 may be pivotally mounted so that the door 24 is able to move between a closed position and an open position.

Operational control of the power supply 20, actuator 10, and credential device 22 may be provided via a power control system including a programmed microcontroller. With reference to FIG. 2, an embodiment of power control system, for providing power from voltage source 38 to one or more actuators 10, is generally indicated by reference numeral 30. In accordance with this embodiment, power control system 30 includes a power supply 20, one or more actuator drivers 26, 28 (such as, but not limited to a motor driver, a solenoid driver, etc.) used to operate respective actuators 10, a microcontroller 32, and optionally one or more batteries 34, 36 (which may be a 12V battery or a 24V battery).

In one aspect of the invention, power supply 20 may be selected to output either 24 VDC or 12 VDC or both, which is supplied by a voltage source 38 (100 VAC-240 VAC). Power supply 20 may by a two-switch forward converter operating at a pulse-width modulation (PWM) switching rate of 100 kHz or higher. The power control system 30 may indicate the presence of AC voltage through the implementation of an isolator 40 that provides an AC present signal to microcontroller 32. The control system may also indicate the status of AC presence along with various under-voltage, over-voltage, under-current, and over-current conditions, such as through LED outputs 94. These voltage and current conditions include those of, but are not limited to, the actuators, the credential devices, the auxiliary output, the battery charger, and the battery. Furthermore, the voltages and currents of the power control system 30 may also be monitored by microcontroller 32 through voltage and current sensors 44 and 46, respectively.

Power control system 30 may also include batteries 34, 36 to provide the necessary power when power supply 20 is no longer receiving adequate AC source voltage (for instance, during a line voltage interruption or unavailability that may occur through a general power outage or power disruption due to a fire). The power supply 20 may be turned off by signal ECO_PWR 42 which also operates the BYPASS relay 48 to allow either 24V battery 34 or 12V battery 36 to provide the requisite DC voltage to system 30, depending upon the current needs, the battery state-of-charge, or specifications of the power control system 30. To maintain battery charge status, power control system 30 may include battery charger 50 which employ switching regulators to provide the appropriate charging voltages and currents to their respective batteries when AC power is present. If a power failure is detected by microcontroller 32, charger 50 is bypassed by relay 48 and battery current is in turn diverted to actuator drivers 26 and 28 and microcontroller 32. Battery voltages are monitored by microcontroller 32 such that, if a battery voltage falls below a predetermined cut-off threshold, microcontroller 32 dis-engages a relay 52 to disconnect the battery from the circuit.

One or more actuator drivers 26, 28 may be under the control of microcontroller 32 so as to selectively enable activation of a respective actuator 10 upon receiving a drive signal from power supply 20.

Figure 3:
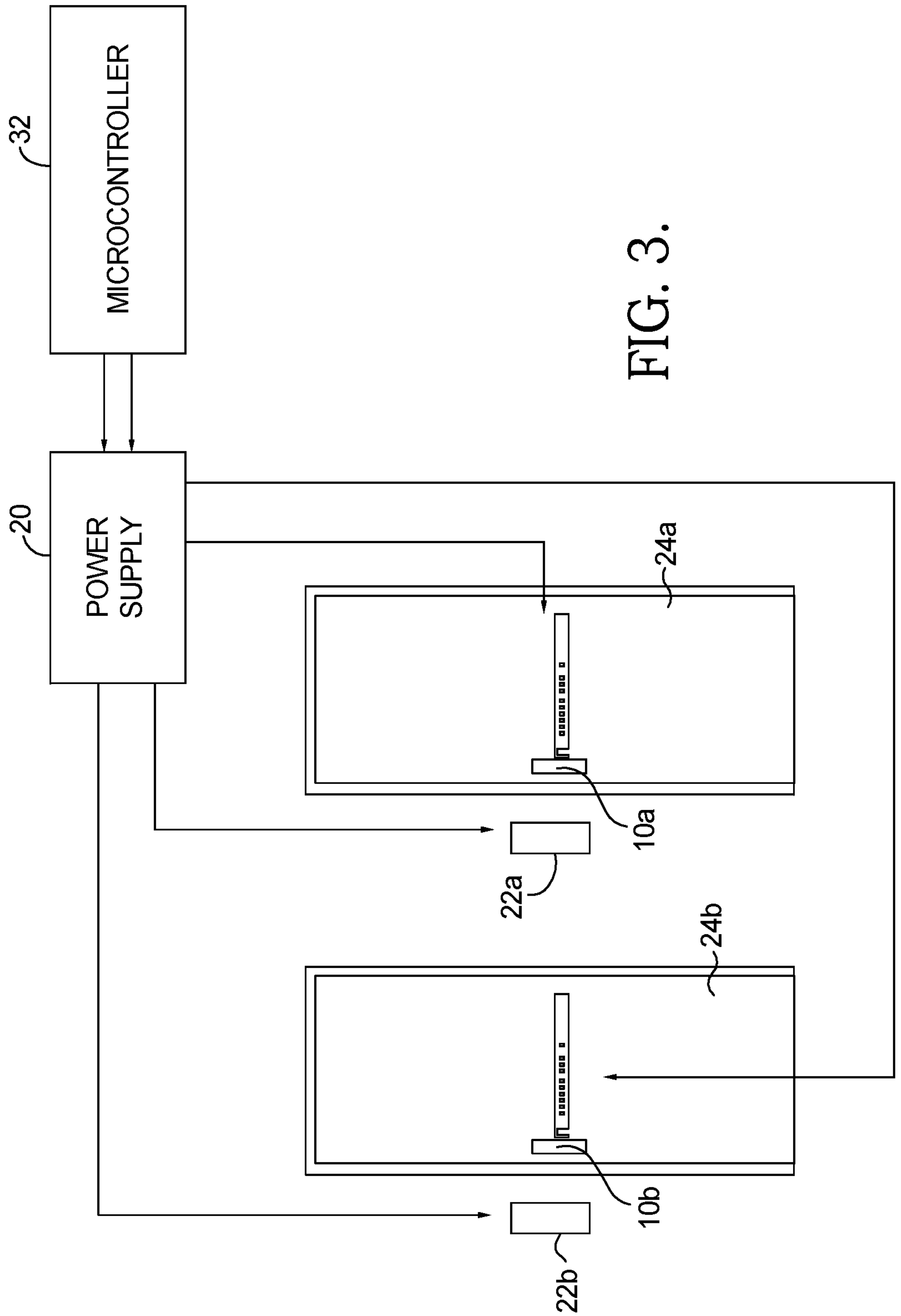
FIG. 3 is a schematic of a power control system having a plurality of actuators and associated credential devices.

As shown in FIG. 3, microcontroller 32 may be configured to operationally monitor and control two distinct actuator drivers 26 and 28 (referred to in FIG. 2 and not shown in FIG. 3) that are associated with the respective actuators 10*a* and 10*b*, wherein a respective actuator 10*a* and 10*b* is coupled to a respective door 24*a* and 24*b* and a respective credential device 22*a* and 22*b*. For example, actuator driver 26 may be a motor and actuator 28 may be a solenoid. To that end, microcontroller 32 may include actuator mode settings that establish whether an output will drive a motor or a solenoid. An exemplary table showing certain mode switch settings is shown in Table 1.

TABLE 1

| Switches | Outputs | |
|---|---|---|
| M0/M1 | #1 | #2 |
| 0 0 | MTR | MTR |
| 0 1 | MTR | SOL |
| 1 0 | SOL | MTR |
| 1 1 | SOL | SOL |

Signals that engage actuators 10*a* and 10*b*, along with the fire alarm input 58 (FIG. 2), are connected to a hardware interrupt and may be processed by interrupt service routines (ISR). Returning to FIG. 2, inputs 60 (/IN #1) and 62 (/IN #2) engage the corresponding actuator connected to outputs 64 (OUT 1) and 66 (OUT 2). As is known in the art, fire alarm input 58 may activate an audible alarm and place microcontroller 32 in a fire alarm mode. Drivers 26 and 28 are configured to each receive a signal from microcontroller 32 to activate a switch (such as a MOSFET, JFET, or BJT, or relay), which provides a conductive path for current through actuator 10*a* or 10*b*. Additionally and/or alternatively, microcontroller 32 may operate a solenoid through drivers 26 and/or 28.

As is acknowledged in the art, solenoid driven actuators have long been known for their power inefficiencies. First, it is known that their pull-in current (pick current) is higher than the current needed to hold the solenoid plunger in place (hold current). Therefore, at a minimum, to save energy, the controller should step down the current after a fixed duration of time following application of the pick current. Second, in a Fail-Secure system, the solenoid is often under a power mode as long as the door must remain unlocked. In a Fail-Safe system, the solenoid is in a power mode for as long as the door must remain locked. Thus, in Fail-Safe systems, without further controls, a large amount of power can be wasted while the solenoid remains powered. To that end, microcontroller 32 includes a timer such that, upon signaling solenoid driver 26/28, microcontroller 32 starts a time interval during which a constant voltage is supplied to drive the solenoid. When this time interval expires, micro-controller 32 provides a PWM drive signal of such duty ratio as to cause the hold current to flow through the solenoid coil. To ensure proper operation, at start-up or reset, the microcontroller reads the status of switch settings that establishes the hold-open time intervals, the actuator modes, and the solenoid hold currents. Switch settings and corresponding time intervals are listed in Table 2.

TABLE 2

| Switches T10/T11/T12 T20/T21/T22 | Time Interval (sec) |
|---|---|
| 0 0 0 | <2 |
| 0 0 1 | 2 |
| 0 1 0 | 5 |
| 0 1 1 | 10 |
| 1 0 0 | 20 |
| 1 0 1 | 30 |
| 1 1 0 | 45 |
| 1 1 1 | 60 |

Apart from, and in addition to, stepping down the supplied power during pick and hold operations, a further avenue for improving efficiencies when powering a solenoid latch is optimizing the magnitude of the current being supplied to the solenoid during each of the pick and hold operations. Thus, in accordance with an embodiment of the present invention, firmware (not shown) in microcontroller 32 may include a self-calibration routine that accommodates varieties of solenoid coil impedances. This routine may use motor driver 26 outputs to momentarily switch a pulse of current through the solenoid coil (actuator 10*a* or 10*b*). The current response is related to the inductance and resistance of the actuator 10*a* or 10*b*.

Figure 4:
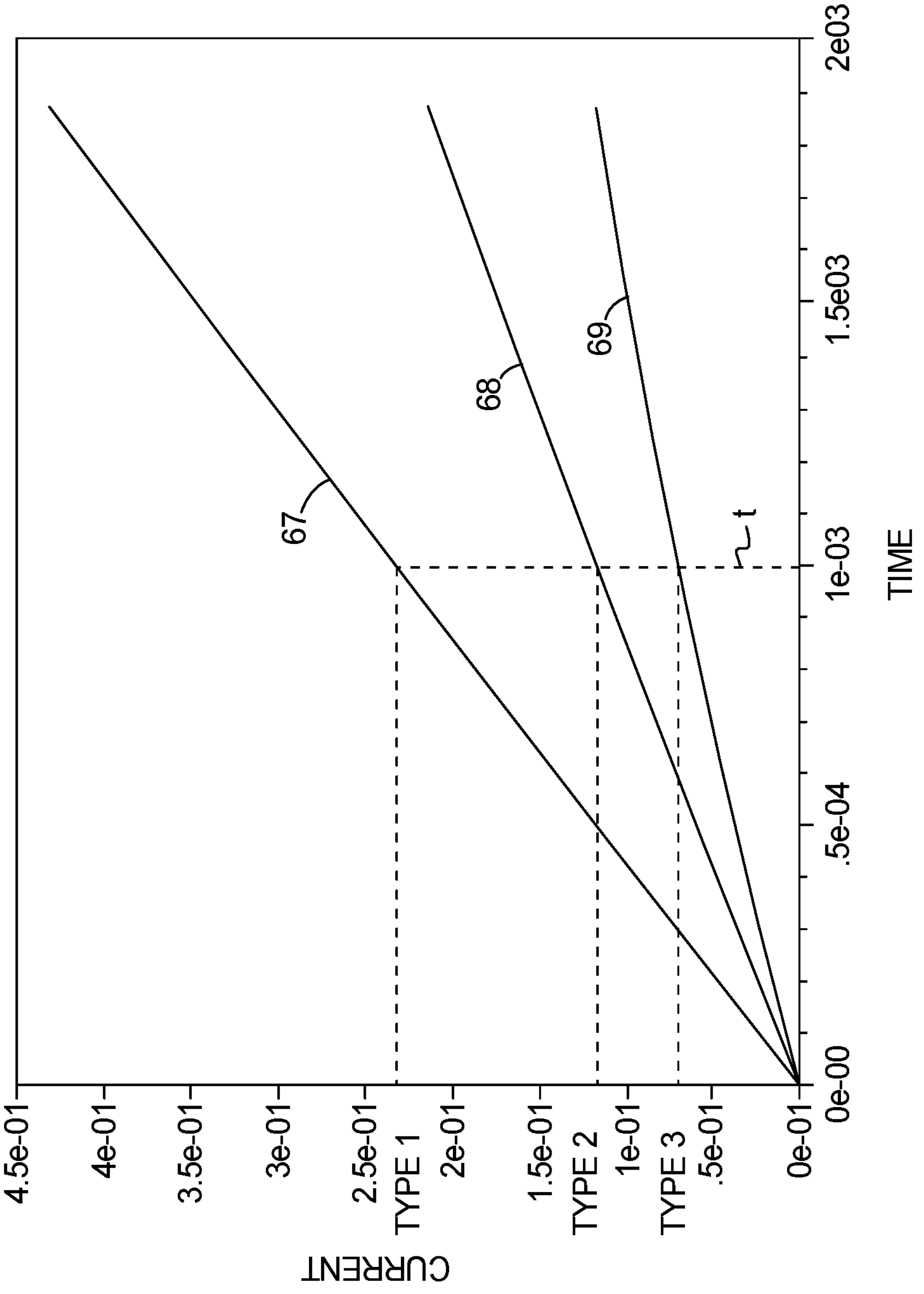
FIG. 4 shows current versus time plots for three types of solenoid coils, in accordance with an aspect of the present invention.

As shown in FIG. 4, if the current is measured at a particular instant in time (t), larger currents are observed for lower impedance coils, wherein curve 67 represents a coil having a relatively low impedance, curve 69 represents a coil having a relatively higher impedance, and curve 68 represents a coil having an impedance between the impedances of the other two. If the current used by a plurality of types of solenoid drivers is observed at the same instant in time, it can be seen that such types of solenoid coil may be readily distinguishable upon interrogation of its instantaneous current values measured at time t. Microcontroller 32 may be populated with a look-up table comprising various solenoid i/t curves. Thus, depending upon the current measured at the selected measurement time t, microcontroller 32 may identify the type of solenoid coil used within actuator 10*a* or 10*b* and output the optimum pick current and hold current for that particular solenoid.

Figure 5:
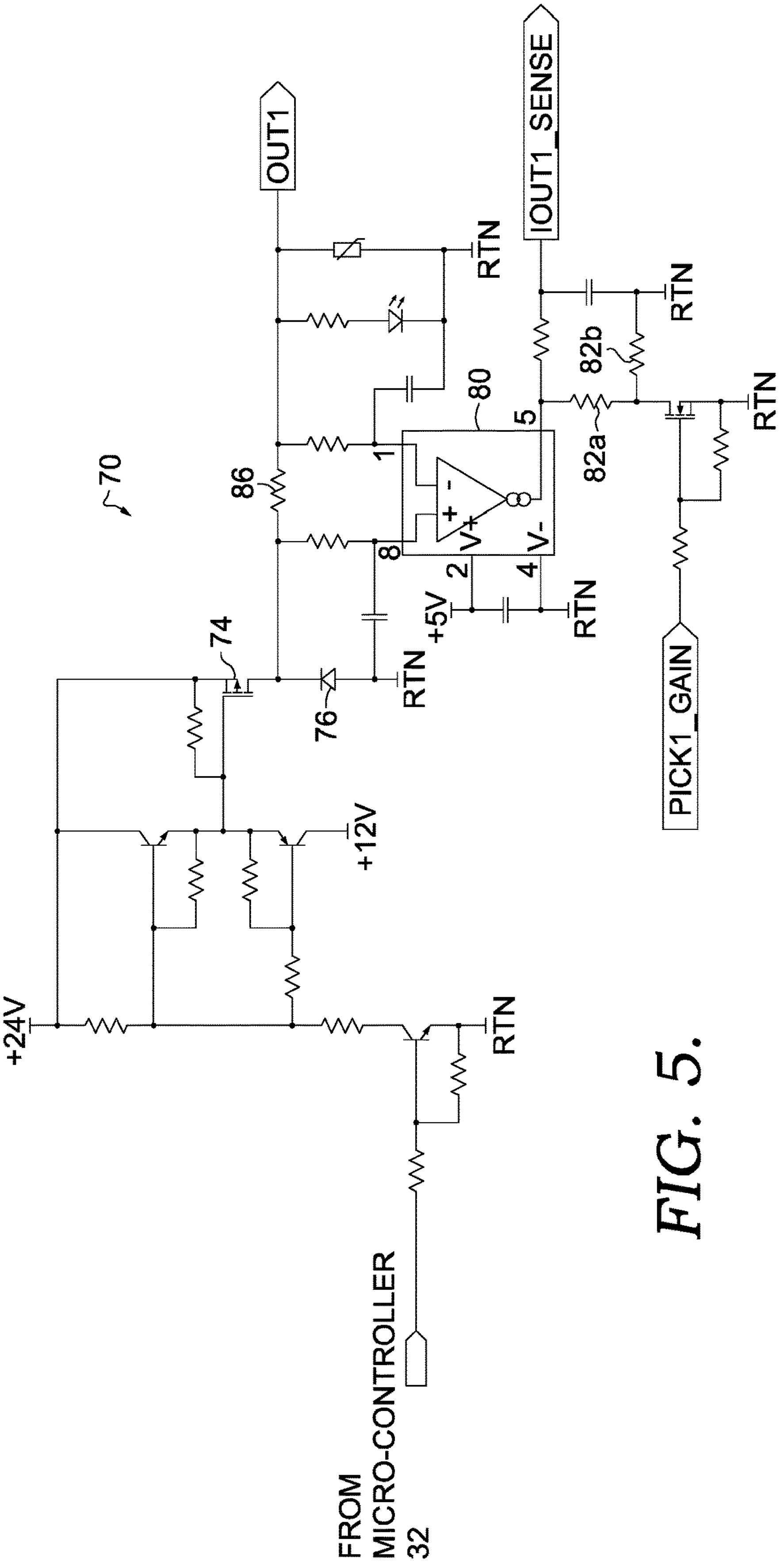
FIG. 5 is a schematic of a switched burden resistor array, in accordance with an embodiment of the present invention.

As shown in FIG. 5, power control system 30 may further include a driver circuit 70 having a primary switch 74 and a secondary switch 76 that may produce a constant current in solenoid coil 10*a* and 10*b* via a pulse-width modulation (PWM) signal from microcontroller 32. Primary switch 74 may be a transistor (such as MOSFET, JFET, or BJT) while secondary switch 76 may be a diode (such as free-wheeling, flyback, or catch diode).

Driver circuit 70 may also include a current-sense amplifier 80, which has two gain resistors 82*a* and 82*b* that are used to sense the two components of the load current; the first in primary switch 74 and the second in secondary switch 76. Current sense resistor 86 is connected to primary switch 74 and secondary switch 76. The voltage across current-sense resistor 86 is amplified by current-sense amplifier 80 to provide an analog voltage to micro-controller 32. During the pulse-current test (described above), microcontroller 32 may measure the output voltage of current-sense amplifier 80 at observation time t. As discussed above, this voltage, which is proportional to coil current, is compared to a table of values to determine the coil type. Once the type of solenoid coil is established, microcontroller 32 determines the required duty ratio to establish the optimum pull-in (pick) current and hold current for that specific solenoid.

Figure 6A:
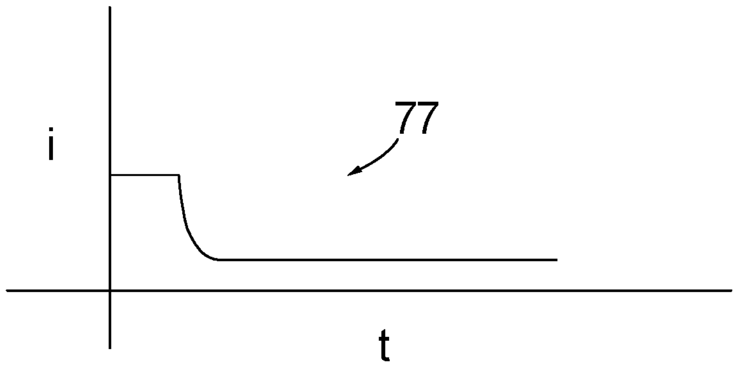
FIGS. 6A through 6C are each current versus time plots showing actuator activation inrush currents, in accordance with an aspect of the present invention.
Figure 6B:
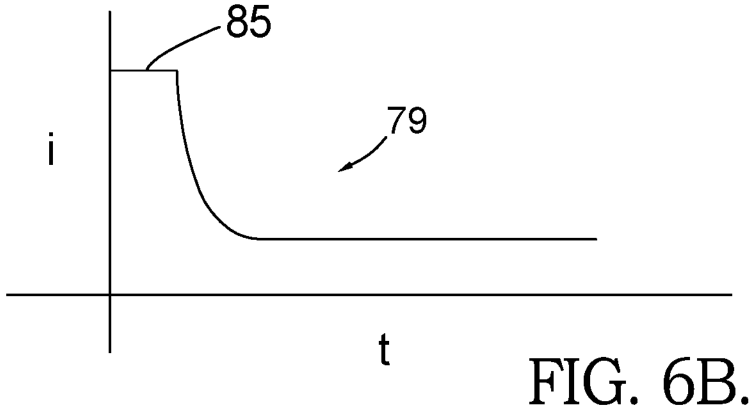
Figure 6C:
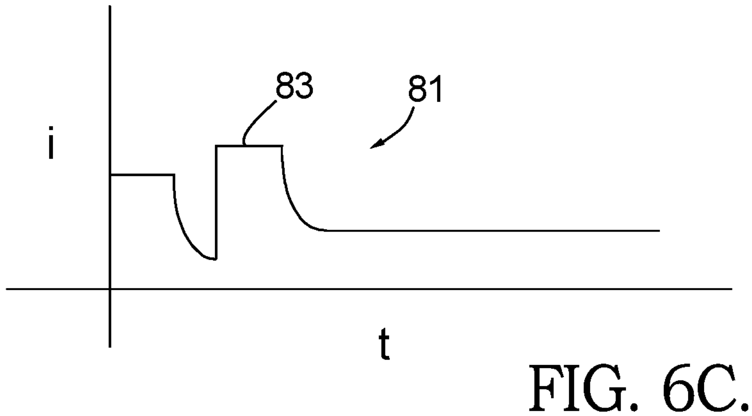

Turning now to FIGS. 6A-6C, the power control system 30 may be configured for staggered activation of multiple actuator/credential devices. For instance, as discussed above with regard to FIG. 3, power control system 30 may be configured to operate two distinct actuator units 10*a* and 10*b*, each having a respective credential device 22*a* and 22*b*. As is currently known in the art, should multiple actuators, whether motors, solenoids, or combinations thereof, be activated at the same time, such as during a fire event, current is supplied simultaneously with the current load being additive for each actuator. Should the actuators be solenoids, this additive load requires relatively high pick currents to power each solenoid (the hold currents are likewise additive). To alleviate the need for high pick currents, in accordance with an aspect of the present invention, microcontroller 32 is configured to energize each actuator sequentially, rather than simultaneously. As a result, the inrush current for each actuator is handled separately leading to a smaller required power supply design.

By way of example, FIG. 6A shows a plot 77 of current over time for a single actuator, such as a solenoid coil. As can be seen in FIG. 6A, the current is initially high (i.e., the pick current) and then steps down to a lower hold current. As shown in FIG. 6B, an exemplary current over time plot 79 is shown for simultaneous activation of two actuators as is presently conducted in the art. As can be seen, when comparing FIG. 6A to FIG. 6B, the pick current has doubled while the hold current has also similarly doubled. Thus, the inrush current to pick both solenoids is relatively high. To alleviate the high inrush current, FIG. 6C shows a current over time plot 81 for a staggered activation in accordance with an embodiment of the present invention. As can be seen, a first actuator is activated with a pick current similar to that shown in FIG. 6A. However, rather than simultaneously supply pick currents to each actuator, microcontroller 32 supplies the pick current to a second actuator only after the first actuator pick current time expires, or nearly expires, and its current is stepped down to the hold current. As a result, the pick current of the second actuator is additive with the lower hold current of the first actuator rather than the first actuator's higher pick current. Thus, the peak inrush current demand 83 is less than that for simultaneous pick current actuation 85 shown in FIG. 6B. This, in turn, improves the power efficiency of power control system 30.

In another embodiment of the present invention, microcontroller 32 may further include access/dog switch inputs 90 and 92 (FIG. 2) to selectively control power operation of power control system 30. In the following discussion, "Access Mode" is when the associated door is continuously locked and a valid authentication access code is needed to unlock the door and, "Dog Mode" is when the associated door is meant to be kept unlocked, such as during the daytime for a retail store (awake mode), or meant to be kept locked without an expected entry, such as during the night-time for a retail store (sleep mode).

In this embodiment, Access/Dog inputs 90 and 92, along with the actuator inputs 60 and 62, comprise the access inputs of power control system 30. When active, inputs 60, 62 and 90, 92 initiate the process of an access request which engages or enables outputs 64, 66, which are operatively connected to corresponding actuators. Access control logic is summarized in Table 3 below. Outputs OUT #1 and OUT #2 are for actuators 10*a* and 10*b*. Outputs CRED #1 and CRED #2 are for credential devices 22*a* and 22*b*. Generally, when in the Access Mode, both credential devices are enabled and the actuators are engaged by their respective inputs. In the Dog Mode, the credential devices are de-activated to reduce energy consumption.

TABLE 3

| | Inputs | | Outputs | | | |
|---|---|---|---|---|---|---|
| ACS/DOG | 1 | 2 | 1 | 2 | 3 | 4 |
| 1/0 | 0 | 0 | 0 | 0 | 1 | 1 |
| 1/0 | 0 | 1 | 0 | 1 | 1 | 1 |
| 1/0 | 1 | 0 | 1 | 0 | 1 | 1 |
| 1/0 | 1 | 1 | 1 | 1 | 1 | 1 |
| 0/1 | 0 | 0 | 0 | 0 | 1 | 1 |
| 0/1 | 0 | 1 | 0 | 1 | 1 | 0 |
| 0/1 | 1 | 0 | 1 | 0 | 0 | 1 |
| 0/1 | 1 | 1 | 1 | 1 | 0 | 0 |

By way of example, power control system 30 may be configured to operate in either an Access Mode or in a Dog Mode for a fail-secure system. When in the Access Mode, the actuators 10*a* and 10*b* are selected to operate in fail-secure mode. In this manner, when the actuators are de-energized, the latch remains engaged with the strike to secure the door, gate, etc. Additionally, credential devices 22*a* and 22*b* are active and using battery power. Thus, power supply is substantially limited only to that required to maintain battery charge. When an access code is entered at credential device 22*a* or 22*b* (such as through a keypad, fob, or key card), power control system awakens and energizes actuators 10*a* and 10*b* thereby allowing for the withdrawal of the latch. In this manner, roughly 97% of the time, power control system 30 is idle and consuming less than about 100 mW. The remaining roughly 3% of the time requires about 15 W (motors) to about 23 W (solenoids) of power from power control system 30 to actuate actuators 10*a* and/or 10*b*. As a result, this power control scheme may equate to greater than 90% energy savings versus existing power supplies.

Power control system 30 may alternatively operate in a Dog Mode for a fail-secure system. During daytime/energized hours, when access is permitted (awake mode), the power control system 30 is awake and power is supplied to actuators 10*a*, 10*b*. Credential devices 22*a*, 22*b* are unpowered as access is readily permitted and door access does not require any authorization through credential devices 22*a* and 22*b*. In accordance with an aspect of the present invention, power control system 30 may automatically enter into its daytime/energized hours mode after power control system 30 senses that the latch has been unlocked (or actuator 10*a*, 10*b* has held the respective latch open) for greater than a predetermined period of time, such as, but not limited to, approximately 60 seconds. Conversely, in the Dog Mode when access is not expected (sleep mode), power control system 30 is placed in sleep mode and credential devices 22*a*, 22*b* are active and running on battery power. As a result, power output from power supply 20 is limited to only that required to maintain battery charge. In this manner, operating power control system 30 in Dog Mode offers approximately 40% energy savings when compared to current power supply systems.

In accordance with the embodiments of the present invention, and referring again to FIG. 2, power control system 30 may be configured to include at least one of status LED outputs 94, fire alarm reset input 96, TAG connector input 98, serial port 102, microcontroller reset 104, and fault clear input 106. A jumper connection of the Fire Alarm Reset input 96 to the return side of power supply 20 may determine whether a momentary activation of the FIRE input initiates a fire alarm. If not jumpered, a momentary fire alarm input is latched and activates a fire alarm. If jumpered, the momentary signal is not latched and a momentary fire alarm is activated. Status LED outputs 94 provide visual indicators to alert personnel of the status of the output voltages (12 and 24 VDC), the output currents, and the batteries.

TAG connector input 98 may be an interface through which the microcontroller can be programmed. The serial port 102 may facilitate firmware debugging. Microcontroller reset 104 may be provided with a push-button switch that allows system users to reset the microcontroller. Fire alarm reset input may be provided with a push-button switch to allow users to reset the fire alarm. The fire alarm reset switch may be connected in parallel with a possible external fire alarm reset switch.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A power control system for use with a first electric lock mechanism having a first actuator, and a second electric lock mechanism having a second actuator, said power control system comprising:

a) a power supply configured to output an output voltage to each of said first actuator and said second actuator, wherein said output voltage to each of said first and second actuators has a first pick current component and a second hold current component, and wherein said pick current component is greater in magnitude than said hold current component;

b) a first credential device coupled to said first electric lock mechanism and powered by said power supply, and a second credential device coupled to said second electric lock mechanism, each of said first and second credential devices configured to signal said power supply to output said output voltage upon receiving an authorized credential; and c) a microcontroller configured to monitor and control said power supply, said first and second credential devices, and said first and second actuators, wherein, in an event when said first and second credential devices signal said power supply simultaneously, said microcontroller senses said event and instructs said power supply to sequentially output said output voltage to said first and second actuators, and wherein said sequential output of said output voltage to said first and second actuators includes said microcontroller instructing said power supply to output said first pick current component to said second actuator only after said first pick current component to said first actuator steps down to said second hold current component of said first actuator, and wherein said instruction to said power supply to output said first pick current component to said second actuator occurs while said second hold current component is being provided to said first actuator.

2. The power control system in accordance with claim 1 including an input delivering a fire alarm signal to said microcontroller, wherein when said microcontroller senses said fire alarm signal said microcontroller instructs said power supply to sequentially output said output voltage to said first and second actuators.

3. A method of supplying a pick current and a hold current to a plurality of actuator devices using a microcontroller, said method comprising the steps of:

a) utilizing said microcontroller to determine that a first actuator device is being activated by a first credential device, and a second actuator device is being activated by a second credential device, wherein said activation of the first and second actuator devices is sequential and in response to the first and second credential devices each receiving an authorized credential;

b) providing a first pick current to said first actuator device;

c) stepping down said first pick current to provide a hold current to said first actuator device; and d) after stepping down said first pick current to said hold current to said first actuator device, providing a second pick current to said second actuator device while said hold current is provided to said first actuator device.

4. The power control system in accordance with claim 1 wherein the authorized credential is an authorized card or an authorized code.

5. The method in accordance with claim 3 wherein the authorized credential is an authorized card or an authorized code.

* * * * *